United States Patent
Alou (10) Patent No.: US 11,340,675 B2
(45) Date of Patent: *May 24, 2022

(54) SYSTEMS, METHODS, AND MEDIA FOR PROVIDING POWER TO AN HDMI SOURCE

(71) Applicant: Google LLC, Mountain View, CA (US)

(72) Inventor: Maurice Alou, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/429,525

(22) Filed: Jun. 3, 2019

(65) Prior Publication Data

US 2019/0286206 A1    Sep. 19, 2019

Related U.S. Application Data

(63) Continuation of application No. 15/319,265, filed as application No. PCT/US2015/036783 on Jun. 19, 2015, now Pat. No. 10,310,578.

(Continued)

(51) Int. Cl.
*G06F 1/16*     (2006.01)
*G06F 1/26*     (2006.01)
*G09G 5/00*     (2006.01)

(52) U.S. Cl.
CPC .......... *G06F 1/266* (2013.01); *G06F 1/1626* (2013.01); *G09G 5/006* (2013.01); *G09G 2370/12* (2013.01); *G09G 2370/22* (2013.01)

(58) Field of Classification Search
USPC ....................................................... 307/130
See application file for complete search history.

(56) References Cited

U.S. PATENT DOCUMENTS

2005/0168152 A1* 8/2005 Blackburn ........ H01J 37/32174
                                                    315/111.21
2010/0269137 A1* 10/2010 Nakajima .......... H04N 21/4135
                                                    725/39

(Continued)

FOREIGN PATENT DOCUMENTS

CN        202738016      2/2013
EP          2172831      4/2010

OTHER PUBLICATIONS

International Search Report and Written Opinion of the International Searching Authority dated Oct. 6, 2015 in International Patent Application No. PCT/US2015/036783.

(Continued)

*Primary Examiner* — Toan T Vu
*Assistant Examiner* — Xuan Ly
(74) *Attorney, Agent, or Firm* — Byrne Poh LLP (57) ABSTRACT

Systems, methods, and media for providing power to an HDMI source are provided. In accordance with some implementations, methods for providing power to an HDMI source are provided, the methods comprising: providing an AC signal to an HPD line of an HDMI port; determining that an L-C circuit is present on the HPD line when applying the AC signal; and in response to determining that an L-C circuit is present on the HPD line, connecting a power source to an HDMI 5 V line of the HDMI port. In some implementations, the AC signal is a 231 kHz waveform. In some implementations, the AC signal is generated using a clock output. In some implementations, the methods further comprise integrating the clock output to provide the AC signal. In some implementations, the methods further comprise switching the frequency of the AC signal.

20 Claims, 6 Drawing Sheets

Related U.S. Application Data (60) Provisional application No. 62/014,633, filed on Jun. 19, 2014.

(56) References Cited

U.S. PATENT DOCUMENTS

| | | | |
|---|---|---|---|
| 2011/0084685 A1 | 4/2011 | Zhong et al. | |
| 2011/0087307 A1* | 4/2011 | Carbunaru | A61N 1/37217 607/61 |
| 2011/0273805 A1 | 11/2011 | Nguyen | |
| 2012/0297207 A1* | 11/2012 | Carlsen | G06F 13/4081 713/300 |
| 2014/0043539 A1* | 2/2014 | Wang | G09G 5/006 348/723 |

OTHER PUBLICATIONS

Notice of Allowance dated Jan. 18, 2019 in U.S. Appl. No. 15/319,265.
Office Action dated Feb. 25, 2019 in CN Patent Application No. 201580032622.5.
Office Action dated May 11, 2017 in KR Patent Application No. 10-2016-7036767.
Office Action dated May 17, 2018 in U.S. Appl. No. 15/319,265.
Office Action dated Jun. 5, 2018 in CN Patent Application No. 201580032622.5.
Examination Report dated Jan. 15, 2021 in IN Patent Application No. 201647041498.

* cited by examiner

```
01  typedef enum {
02      STATE_IDLE,
03      STATE_NORMAL_SOURCE,
04      STATE_PoH_SOURCE
05  } t_state;
06  t_state state = STATE_IDLE;
07
08  void permanent_5V(bool b) {
09      if (b) {
10          set_gpio(P26,1);
11          delay_ms(10); /* turn on time of TPS2051 */
12      } else {
13          set_gpio(P26,0);
14          delay_ms(20); /* turn off time of TPS2051 */
15      }
16  }
17
18  void set_hpd_out(bool b) {
19      if (b) {
20          set_gpio(P11,1);
21      } else {
22          set_gpio(P11,0);
23      }
24  }
25
26  bool get_hpd_in(void) {
27      return get_gpio(P17) == 1;
28  }
29
30  bool is_hdmi_5V(void) {
31      /* TODO require debouncing */
32      return get_gpio(P15) == 1;
33  }
```

```
34  bool is_oemdet(void) {
35      return get_gpio(P10) == 0;
36  }
37
38  const i16_t freq[] = {50,49,51,48,52};
39  bool is_hpd_lc(void) {
40      bool b;
41      i16_t i;
42      for (i = 0; i < sizeof(freq)/sizeof(*freq); i++) {
43          set_clock_period(freq[i]);
44          set_clock_enable(true);
45          delay_ms(3);
46          b = is_oemdet();
47          set_clock_enabled(false);
48          if (b) return true;
49      }
50      return false;
51  }
```

FIG. 4B

```
52  void main() {
53      for (;;) {
54          if (state == STATE_IDLE) {
55              permanent_5V(false);
56              set_hpd_out(get_hpd_in());
57              if (is_hdmi_5V()) {
58                  state = STATE_NORMAL_SOURCE;
59              } else if (is_hpd_lc()) {
60                  state = STATE_PoH_SOURCE;
61              } else {
62                  delay_ms(1000);
63              }
64          } else if (state == STATE_NORMAL_SOURCE) {
65              permanent_5V(false);
66              set_hpd_out(get_hpd_in());
67              if (!is_hdmi_5V()) {
68                  state = STATE_IDLE;
69              }
70          } else if (state == STATE_PoH_SOURCE) {
71              permanent_5V(true);
72              set_hpd_out(get_hpd_in());
73              if (!is_hpd_lc()) {
74                  state = STATE_IDLE;
75              } else {
76                  delay_ms(1000);
77              }
78          }
79      } /* for */
80  } /* main */
```

SYSTEMS, METHODS, AND MEDIA FOR PROVIDING POWER TO AN HDMI SOURCE

CROSS REFERENCE TO RELATED APPLICATIONS

This application is a continuation of U.S. patent application Ser. No. 15/319,265, filed Dec. 15, 2016, which is a national stage application under 35 U.S.C. § 371 of International Patent Application No. PCT/US2015/036783, filed Jun. 19, 2015, which claims the benefit of U.S. Provisional Patent Application No. 62/014,633, filed Jun. 19, 2014, each of which is hereby incorporated by reference herein in its entirety.

BACKGROUND

With recent advances in video and graphics rendering and communications has come source media devices (hereinafter, each an "HDMI source") that are capable of plugging into an HDMI port of a sink media device (hereinafter, an "HDMI sink") such as a television or monitor.

Currently, simple HDMI sources use external power supplies to provide power to those sources because the HDMI specification does not provide for an HDMI sink (such as a television) to provide power to the HDMI source through its HDMI connector. Avoiding using an external power supply may be desirable for a variety of reasons, such as cost and ease of use.

SUMMARY

Systems, methods, and media for providing power to an HDMI source are provided. In accordance with some implementations, methods for providing power to an HDMI source are provided, the methods comprising: providing an AC signal to an HPD line of an HDMI port; determining that an L-C circuit is present on the HPD line when applying the AC signal; and in response to determining that an L-C circuit is present on the HPD line, connecting a power source to an HDMI 5V line of the HDMI port. In some implementations, the AC signal is a 231 kHz waveform. In some implementations, the AC signal is generated using a clock output. In some implementations, the methods further comprise integrating the clock output to provide the AC signal. In some implementations, the methods further comprise switching the frequency of the AC signal. In implementations, determining that an L-C circuit is present on the HPD line comprises determining whether the AC signal is resonating in the L-C circuit. In some implementations, the methods further comprise: detecting a value of an HPD line of an HDMI sink; and providing the value to an HPD line of an HDMI source. In some implementation, the methods further comprise: determining that an L-C circuit is not present on the HPD line when applying the AC signal; and in response to determining that an L-C circuit is not present on the HPD line, disconnects a power source from an HDMI 5V line of the HDMI port.

In accordance with some implementations, circuits for providing power to an HDMI source are provided, the circuits comprising: a microcontroller configured to: provide an AC signal to an HPD line of an HDMI port; determine that an L-C circuit is present on the HPD line when applying the AC signal; and in response to determining that an L-C circuit is present on the HPD line, connect a power source to an HDMI 5V line of the HDMI port. In some implementations, the AC signal is a 231 kHz waveform. In some implementations, the AC signal is generating using a clock output of the microcontroller. In some implementations, the circuits further comprise an integrator coupled to the clock output which integrates to the clock output to provide the AC signal. In some implementations, the microcontroller also switches the frequency of the AC signal. In some implementations, determining that an L-C circuit is present on the HPD line comprises determining whether the AC signal is resonating in the L-C circuit. In some implementations, the microcontroller also: detects a value of an HPD line of an HDMI sink; and provides the value to an HPD line of an HDMI source. In some implementations, the microcontroller also: determines that an L-C circuit is not present on the HPD line when applying the AC signal; and in response to determining that an L-C circuit is not present on the HPD line, disconnects a power source from an HDMI 5V line of the HDMI port.

DETAILED DESCRIPTION

In accordance with some implementations, mechanisms are provided for detecting if an HDMI source is connected to an HDMI port and, if yes, providing power through the HDMI port (e.g., using pin 18 of the port's HDMI connector, which is normally used by a TV to detect the presence of an HDMI source).

Figure 1:
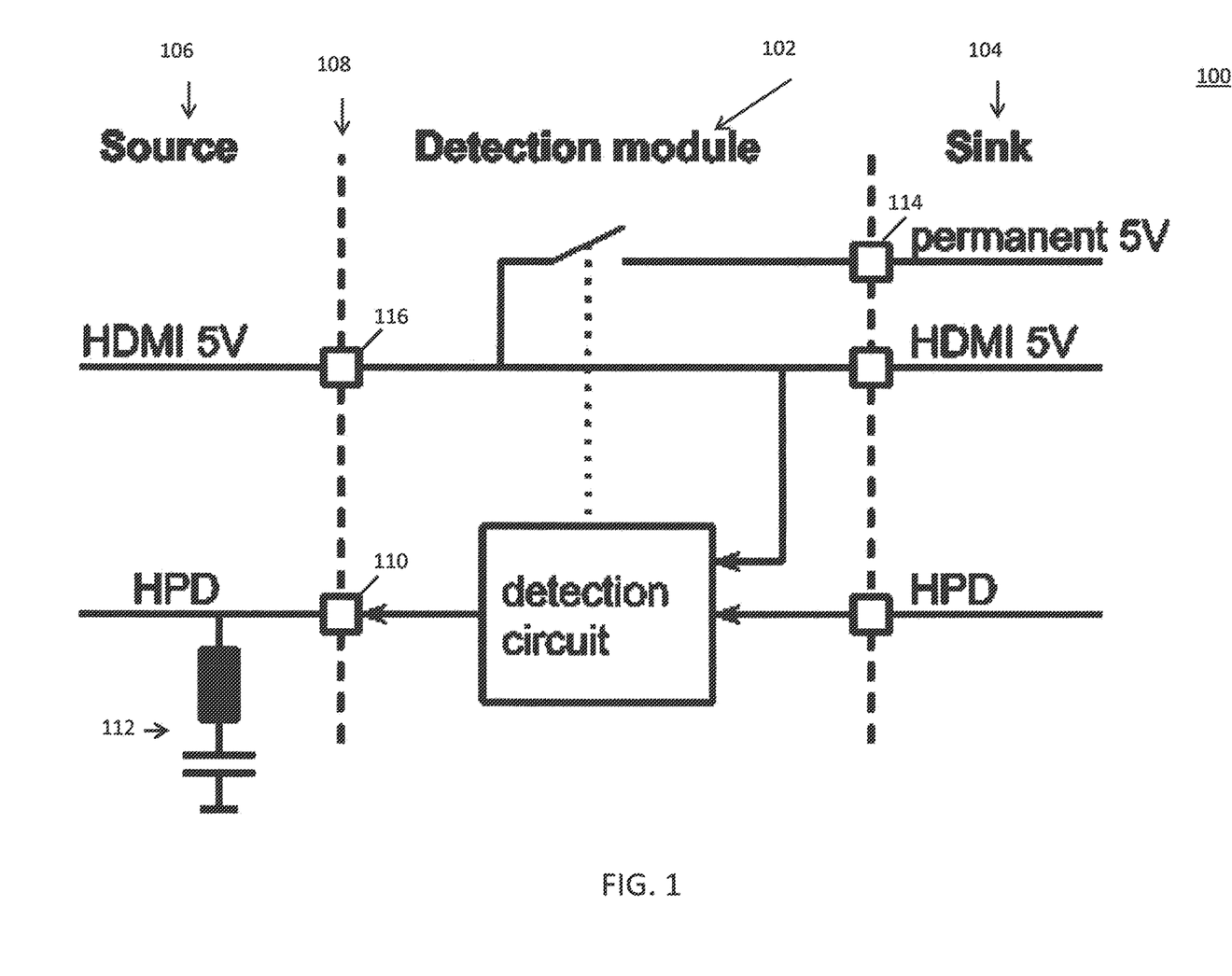
FIG. 1 is an example of a block diagram of hardware for detecting an HDMI source and providing power to the HDMI source in accordance with some implementations.

An example 100 of a mechanism in accordance with some implementations is shown in FIG. 1. As illustrated, mechanism 100 can be implemented as a detection module 102 that is present between an HDMI sink 104 and an HDMI source 106. In some implementations, the detection module uses a presence line 110 (e.g., an "HPD" line) of a port 108 to detect the presence of the HDMI source by applying a low voltage stimulus (e.g., which may be harmless to an unpowered source) to determine if a resonant L-C circuit 112 of the HDMI source can be detected. When the resonant L-C circuit of the HDMI source has been detected, the detection module may then apply a supply voltage (e.g., a 5V supply voltage via a "permanent 5V" line 114) to a supply voltage line 116 (e.g., an "HDMI 5V" line). The sink in turn may set presence line 110 (e.g., the "HPD" line) active high and the detection module may then propagate the active high signal to the source.

Although detection module 102 of FIG. 1 is illustrated as being located between a port of HDMI source 106 and HDMI sink 104, the detection module can be integrated with or can be part of HDMI sink 104 in some implementations so that the port of the HDMI sink is port 108 in some implementations.

The detection module may then continuously or periodically probe presence line 110 (e.g., the "HPD" line) to detect the removal of the HDMI source, in which case the detection module may disconnect the supply voltage (e.g., from the "permanent 5V" line) from supply voltage line 116 (e.g., the "HDMI 5V" line).

Figure 2:
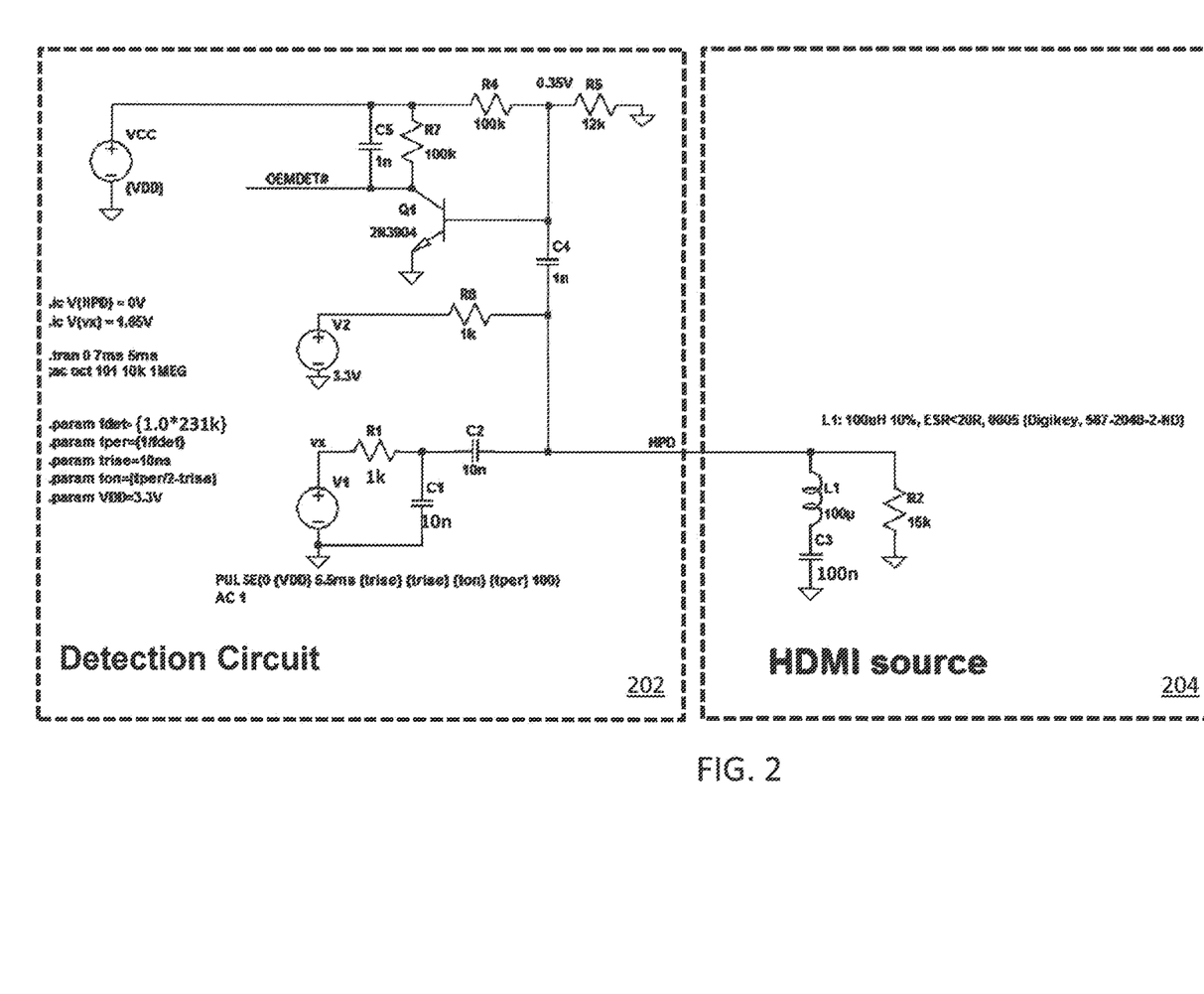
FIG. 2 is an example of a schematic diagram of a circuit for detecting an HDMI source and providing power to the HDMI source in accordance with some implementations.

FIG. 2 shows an example of an analog front end of a detection circuit that is part of an HDMI sink in area 202 and an example of a resonant L-C circuit to be detected in area 204, in accordance with some implementations.

The voltage sources V1 and V2 in FIG. 2 represent general purpose outputs (GPOs) of a microcontroller (or other suitable device(s)) and the active low signal OEMDET # can be used to inform the microcontroller (or other suitable device(s)) when the L-C circuit has been detected.

The voltage source VCC represents a 3.3V power supply (or any other suitable power supply) of the analog front end (which can also be used to power a microcontroller (or other suitable device(s)) (not shown) if desired).

The HDMI sink detects the HDMI source by detecting the presence of a resonant L1-C3 circuit in the HDMI source. The resonant frequency can be determined by L1 and the equivalent capacitance (Ceq) of C1, C2, and C3 in series (e.g., as shown in the example of FIG. 2, L1 can be 100 µH, Ceq can be 4.76 nF, and the resonant frequency can be 231 kHz, in some implementations). In this example, when the HDMI source is not connected, the waveform on the HPD line can be triangular at 231 kHz with a peak-peak value of 340 mV centered around 0V. This signal can be generated by driving the integrator circuit R1-C1 with a 0V-3.3V 231 kHz square wave from the GPO V1.

When the HDMI source is connected, the circuit in the example of FIG. 2 resonates at 231 kHz and the amplitude of the waveform on HPD line is a sine wave with a peak-peak amplitude of:

$$898 \text{ mV} = \frac{3.3 \text{ V} \cdot H1 \cdot G \cdot R_{eq}}{G^2 \cdot R1 + R_{eq}},$$

wherein:

$$G = 1 + C1/C2 = 2;$$

$$Q = \frac{\omega \cdot L1}{R_S} = \frac{2 \cdot \pi \cdot 231 \text{ kHz} \cdot 100 \text{ µH}}{20 \text{ Ω}} = 7.25$$

$$R_p = R_s \cdot (1 + Q^2) = 1072 \text{ Ω}$$

$$Req = R8 // R2 // R5 // R_p = 480 \text{ Ω}; \text{ and}$$

$H1 = 4/\pi = 1.27$, which is the 1st harmonic of a unity square wave.

It is assumed in the above calculations that (i) the serial resistance $R_S$ of the inductor is 20Ω, which takes into account the DC resistance, the core loss at 231 kHz and skin effect, and (ii) $C3 \gg (C1 \cdot C2)/(C1+C2)$.

As shown, this signal is AC coupled by C4 to the 350 mV DC bias of Q1 and turns on Q1 during the positive phase of the waveform (350 mV+898 mV/2=799 mV). The R7-C5 circuit on the collector of Q1 filters the active low signal OEMDET # which instructs the microcontroller (or other suitable device) to apply HDMI 5V to the HDMI source (e.g., as shown in FIG. 1).

Because the detection signal is AC coupled to Q1, detection can be performed when the HPD line is high or low (as driven by V2 at 0 or 3.3V, for example); thus, the detection can be performed periodically to detect the removal of the HDMI source as well.

Although not shown in FIG. 2, any suitable circuit for connecting and disconnecting a supply voltage (e.g., a 5V voltage) from the HDMI sink to the HDMI source under the control of the microcontroller (or other suitable device) can be provided in some implementations. For example, a switch controlled by the microcontroller can be used to connect and disconnect the supply voltage from the HDMI sink to the HDMI source.

Figure 3:
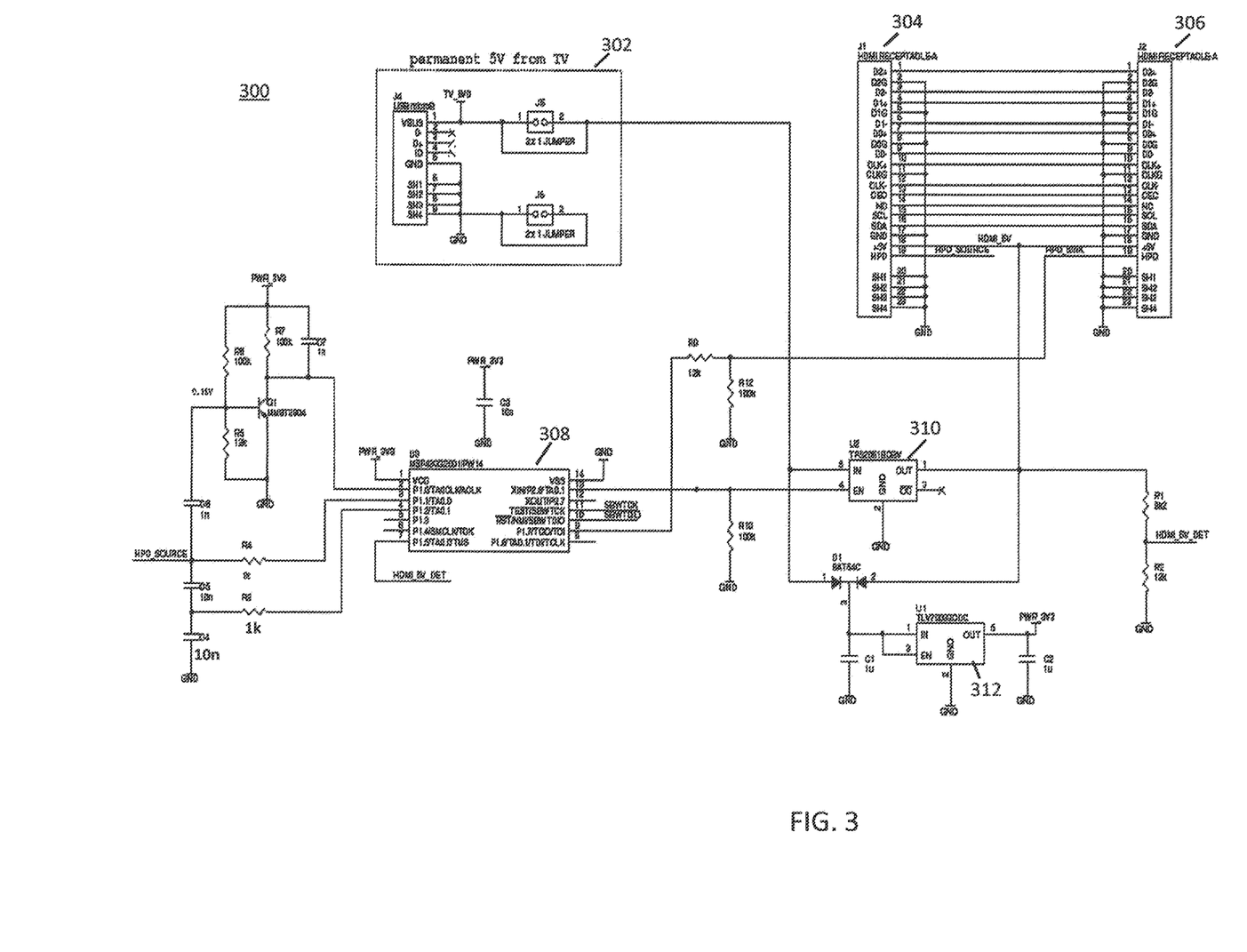
FIG. 3 is an example of a more detailed schematic diagram of a circuit for detecting an HDMI source and providing power to the HDMI source in accordance with some implementations.

Another example 300 of a circuit for implementing some implementations of mechanisms disclosed herein is illustrated in FIG. 3. As shown, circuit 300 includes many of the same components as shown in FIG. 2. For example, the transistor, resistors, and capacitors shown in area 202 of FIG. 2 are also shown in FIG. 3. The voltage sources V1 and V2 of FIG. 2 are shown in FIG. 3 by two GPOs of microcontroller 308 (which can be any suitable device (e.g., a hardware processor for controlling the operation of the mechanisms described herein) such as an MSP430G2001IPW14 microcontroller available from Texas Instruments of Dallas, Tex.). The voltage source VCC of FIG. 2 is shown in FIG. 3 by a 3.3V regulator 310 (which can be any suitable device for providing power, such as a TLV70033 regulator available from Texas Instruments of Dallas, Tex.). Regulator 310 can receive power at its input from a permanent 5V source 302 (e.g., a USB port of a TV) or the HDMI 5V line between the source HDMI receptacle 304 and the sink HDMI receptacle 306, via diodes D1 (which can be any suitable diodes). A switch which provides power between the permanent 5V line and the HDMI 5V line (described above in connection with FIG. 1) can be provided by controllable switch 510 (which can be any suitable device for controlling a connection between a source of power and the HDMI 5V line, such as a TPS2051 switch available from Texas Instruments of Dallas, Tex.).

Figure 4A:
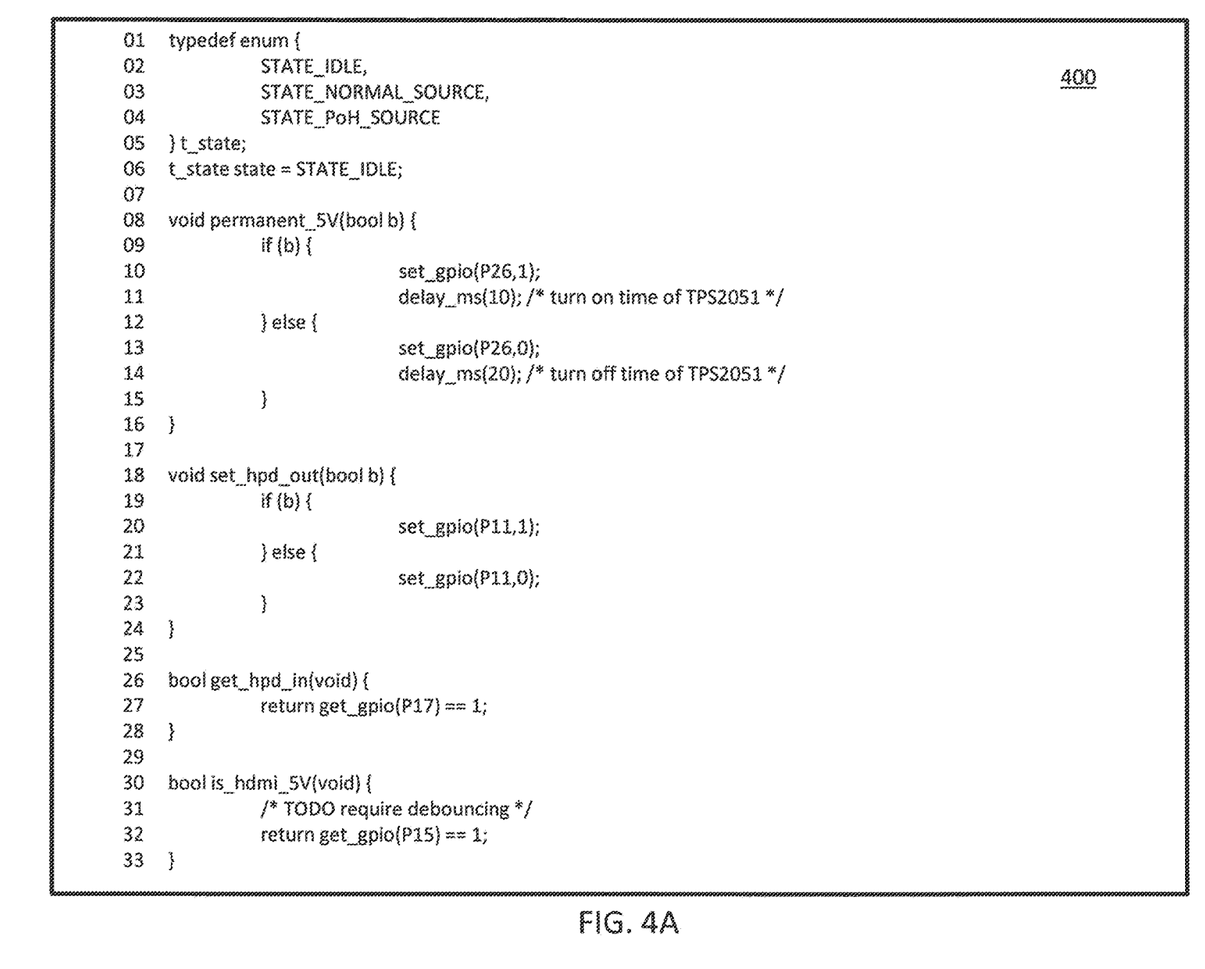
FIGS. 4A-4C together show an example of instructions that can be executed in a microcontroller (or other suitable device) for detecting an HDMI source and providing power to the HDMI source in accordance with some implementations.
Figure 4B:
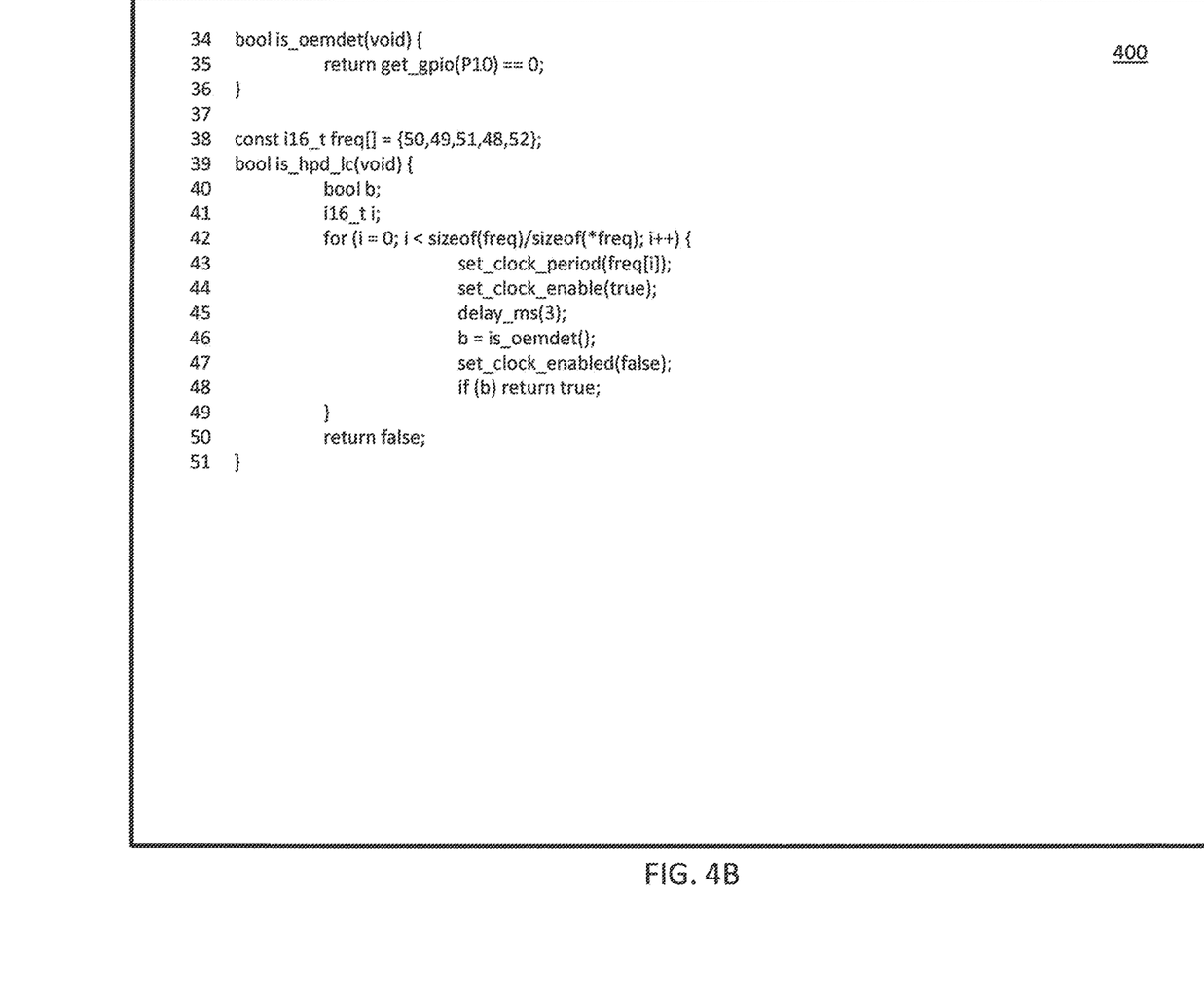
Figure 4C:
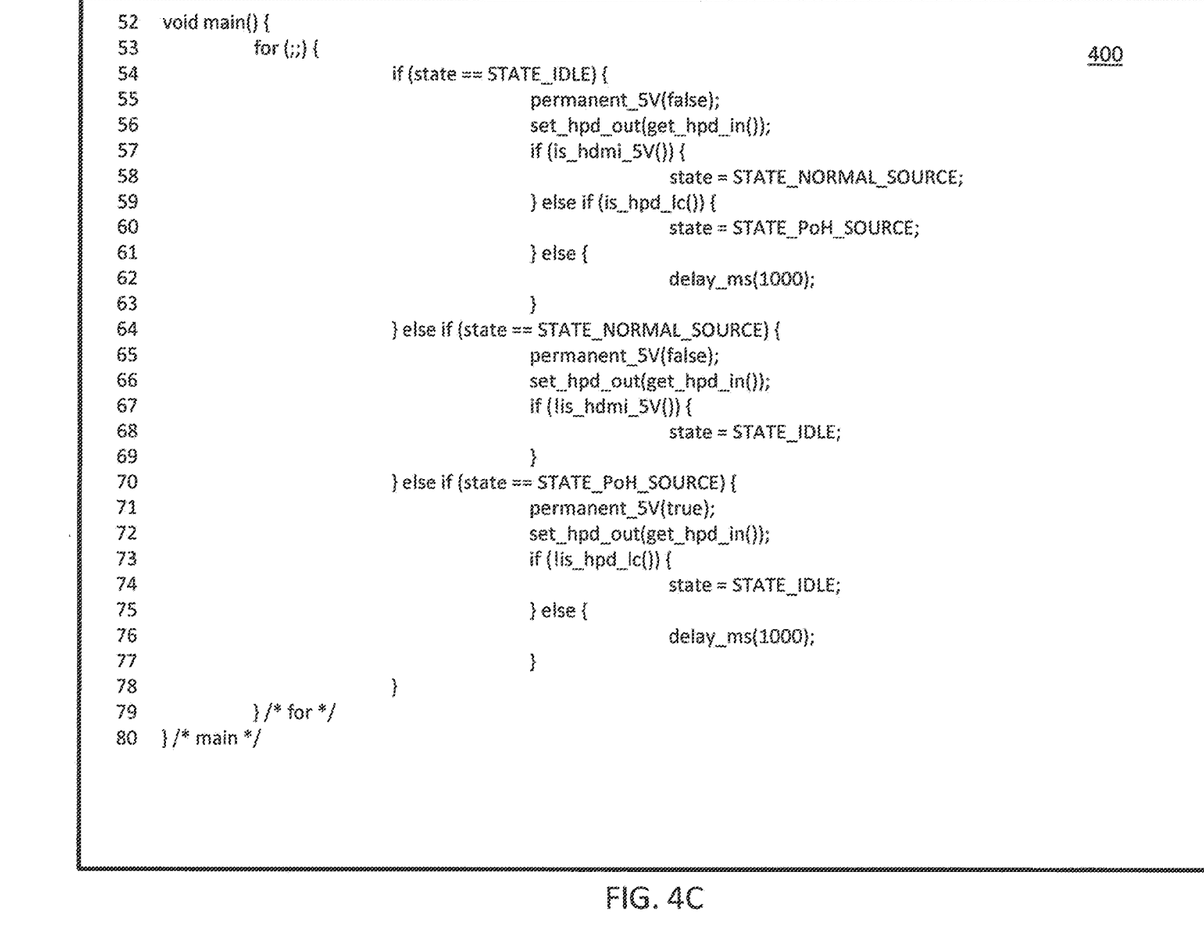

In accordance with some implementations, instructions that can be executed in a microcontroller (or other suitable device) in conjunction with the circuits of FIGS. 2 and 3 are illustrated in FIGS. 4A, 4B, and 4C.

As shown, the instructions at lines 01-06 define a state variable as having one of three possible states ("idle," "normal source," and "power-over-HDMI source") and set the state's initial value.

The instructions at lines 08-16 turn ON or OFF a GPO that controls a switch that connects the permanent 5V line to the HDMI 5V line.

The instructions at lines 18-24 set the value on the HPD line at the source connector as either a 0 or a 1.

The instructions at lines 26-28 determine a state of the HPD line at the sink connector.

The instructions at lines 30-33 return whether 5V is at the output of the switch (i.e., at the HDMI 5V line between the sink and the source).

The instructions at lines 34-36 check the signal of the collector of transistor Q1 to determine whether an L-C circuit is detected.

The instructions at lines 38-51 apply a clock signal at different frequencies (e.g., 231 kHz, 231 kHz+3%, 231 kHz-3%, 231 kHz+6%, 231 kHz-6%, . . . , 231 kHz+15%, 231 kHz-15%, and/or any other suitable frequencies) to the HPD line to determine whether the L-C circuit can be detected. As shown in these instructions, the clock signal can be provided at different frequencies to account for tolerances in the characteristics of the inductor and the capacitor making up the L-C circuit.

The instructions at lines 52-80 form the main procedure of the instructions and execute an infinite loop that perform three different groups of steps based on whether the process is in one of the three difference states.

As shown, if the state is the idle state, the process:
a. turns off the 5V switch;
b. sets the HPD line at the source to match the HPD line at the sink;
c. if 5V is on the HDMI 5V line, sets the state to the normal source state;
d. if 5V is not on the HDMI 5V line and the HPD line is connected to an L-C circuit, sets the state to a power-over-HDMI source state; and
e. if 5V is not on the HDMI 5V line and the HPD line is not connected to an L-C circuit, delays the process by one second and leaves the state in the idle state.

If the state is in the normal source state, the process:
a. turns off the 5V switch;
b. sets the HPD line at the source to match the HPD line at the sink; and
c. if the HDMI 5V line is not at 5V, sets the state to the idle state.

If the state is in the power-over-HDMI source state, the process:
a. turns on the 5V switch;
b. sets the HPD line at the source to match the HPD line at the sink;
c. if the HPD line is not connected to an L-C circuit, sets the state to an idle state; and
d. if the HPD line is connected to an L-C circuit, delays the process by one second and leaves the state in the power-over-HDMI source state.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method for providing power to an HDMI source, comprising:
   providing a signal to a presence line of a port;
   determining that an L-C circuit is present on the presence line when providing the signal; and
   in response to determining that the L-C circuit is present on the presence line, connecting a power source to a supply voltage line of the port.

2. The method of claim 1, wherein the signal is a low voltage stimulus signal.

3. The method of claim 1, wherein the signal is an AC signal having a 231 kHz waveform.

4. The method of claim 3, wherein the AC signal is generated using a clock output.

5. The method of claim 4, further comprising integrating the clock output to provide the AC signal.

6. The method of claim 1, further comprising switching the frequency of the signal.

7. The method of claim 1, wherein determining that the L-C circuit is present on the presence line comprises determining whether the signal is resonating in the L-C circuit.

8. The method of claim 1, wherein the port is an HDMI port and wherein the method further comprises:
   detecting a value of the presence line of an HDMI sink; and
   providing the value to the presence line of the HDMI source.

9. The method of claim 1, further comprising continuously determining whether the L-C circuit is present on the presence line when providing the signal.

10. The method of claim 9, further comprising:
    determining that the L-C circuit is not present on the presence line when providing the signal; and
    in response to determining that the L-C circuit is not present on the presence line, disconnecting the power source from the supply voltage line of the port.

11. A circuit for providing power to an HDMI source, comprising:
    a microcontroller configured to:
        provide a signal to a presence line of a port;
        determine that an L-C circuit is present on the presence line when providing the signal; and
        in response to determining that the L-C circuit is present on the presence line, connect a power source to a supply voltage line of the port.

12. The circuit of claim 11, wherein the signal is a low voltage stimulus signal.

13. The circuit of claim 11, wherein the signal is an AC signal having a 231 kHz waveform.

14. The circuit of claim 13, wherein the AC signal is generating using a clock output of the microcontroller.

15. The circuit of claim 14, further comprising an integrator coupled to the clock output which integrates the clock output to provide the AC signal.

16. The circuit of claim 11, wherein the microcontroller is further configured to switch the frequency of the signal.

17. The circuit of claim 11, wherein determining that the L-C circuit is present on the presence line comprises determining whether the signal is resonating in the L-C circuit.

18. The circuit of claim 11, wherein the port is an HDMI port and wherein the microcontroller is further configured to:
- detect a value of the presence line of an HDMI sink; and
- provides the value to the presence line of the HDMI source.

19. The circuit of claim 11, wherein the microcontroller is further configured to continuously determine whether the L-C circuit is present on the presence line when providing the signal.

20. The circuit of claim 19, wherein the microcontroller is further configured to:
- determine that the L-C circuit is not present on the presence line when providing the signal; and
- in response to determining that the L-C circuit is not present on the presence line, disconnect the power source from the supply voltage line of the port.

\* \* \* \* \*